B. F. TALLEY.
PRUNING IMPLEMENT.
APPLICATION FILED MAR. 27, 1908.
899,687.
Patented Sept. 29, 1908.
2 SHEETS—SHEET 1.
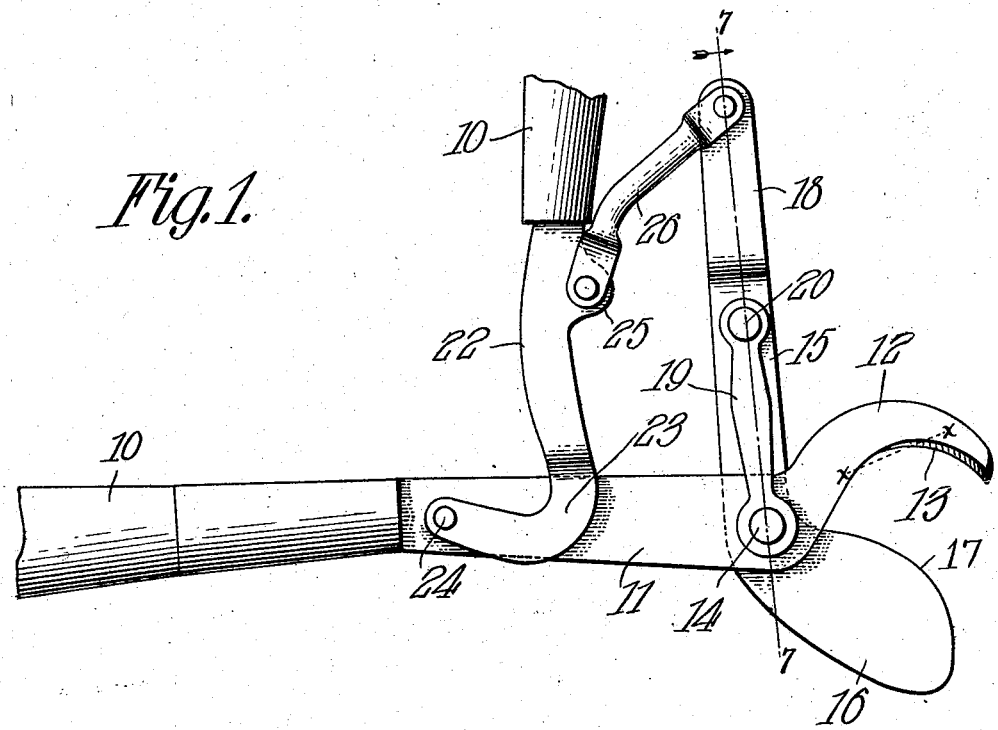
Fig. 1.
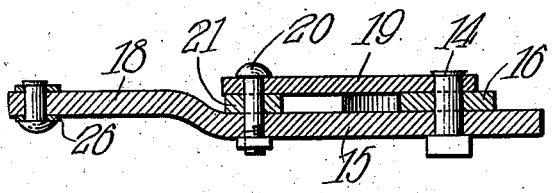
Fig. 7.
Witnesses
Chas. C. Richardson.
F. G. Smith.
Inventor
Benjamin F. Talley.
By 
Attorneys

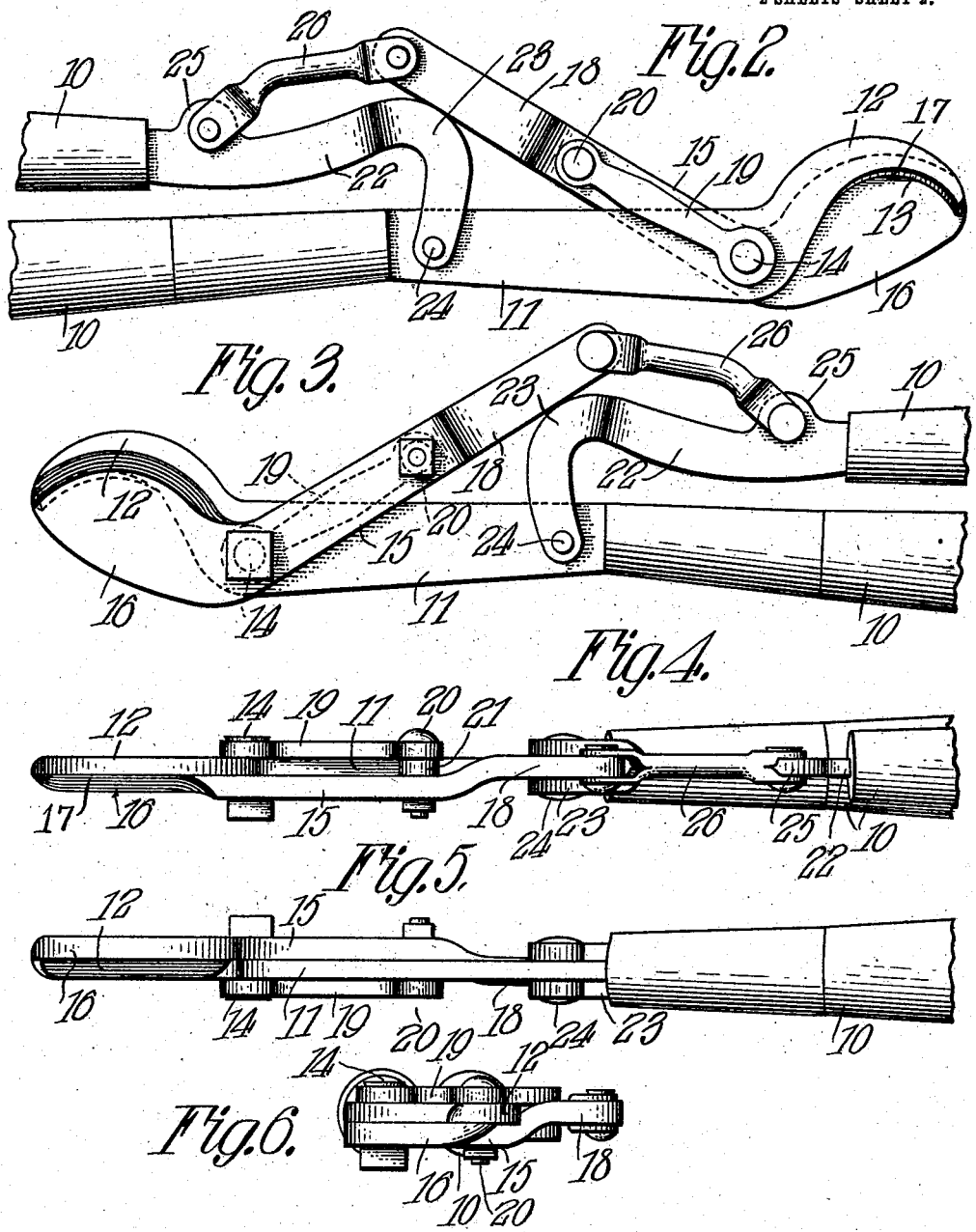

UNITED STATES PATENT OFFICE.

BENJAMIN F. TALLEY, OF WAKITA, OKLAHOMA, ASSIGNOR OF ONE-HALF TO M. B. RUTHERFORD, OF WAKITA, OKLAHOMA.

PRUNING IMPLEMENT.

No. 899,687.  Specification of Letters Patent.  Patented Sept. 29, 1908.

Application filed March 27, 1908. Serial No. 423,625.

*To all whom it may concern:*

Be it known that I, BENJAMIN F. TALLEY, a citizen of the United States, residing at Wakita, in the county of Grant, State of Oklahoma, have invented certain new and useful Improvements in Pruning Implements; and I do hereby declare the following to be a full, clear, and exact description of the invention, such as will enable others skilled in the art to which it appertains to make and use the same.

This invention relates to pruning implements and has for its object to provide an implement of this class which will be more effectual in operation than ones now on the market and one in which the cutting members will firmly grip the limb being cut, at the time they operate to perform the cutting operation.

In carrying out my invention, I provide an implement of this class comprising a member formed with a limb engaging hook and pivot to this member an arm which is formed with a blade portion the cutting edge of which is convexed and has an arc of curvature greater than the arc of curvature of the concaved edge of the limb engaging hook. Means is connected with the said arm for swinging it upon its pivot so as to bring its blade portion into coöperative relation with respect to the limb engaging hook and thereby sever the limb engaged thereby. By reason of the fact that the arc of curvature of the cutting edge of the blade portion of the arm is greater than the arc of curvature of the concaved edge of the limb engaging hook, the limb being cut will be firmly held in the concavity of the hook when the arm is swung to bring its blade portion in engagement with the limb.

Another feature of my invention resides in the provision of means for bracing the pivotal connection of the arm with the member above described.

In the accompanying drawings, Figure 1 is a side elevation of the implement showing the same open, Fig. 2 is a similar view showing the same closed, Fig. 3 is a view similar to Fig. 2 but looking at the opposite side of the implement, Fig. 4 is a front edge view thereof, Fig. 5 is a rear edge view, Fig. 6 is a top edge view, and Fig. 7 is a sectional view taken on the line 7—7 of Fig. 1.

As shown in the drawings, the implement embodied in my invention includes a pair of handles which are indicated by the numeral 10 and which may be of any desired length, size and shape. Fixed in one end of one of the handles 10 is the tang end of one of the cutting members of the implement this member including a shank 11 and being formed at the end of its shank with a limb engaging hook 12 having a beveled concave edge 13 the extent of which is in the line of a compound curve, that portion of the edge between the letters $x$—$x$ being curved to a greater degree than any other portion of the said edge for a purpose which will presently be made apparent.

A pin 14 serves to pivotally connect to the member 10 at the point of junction of its shank and hook portion, a blade arm 15. The hook portion 12 of the first mentioned member is offset as is clearly shown in the side elevation of the drawings and the blade arm 15 is formed beyond its pivot 14 with an offset blade portion 16, the blade portion being offset in the same direction as the hook portion 12 and being formed with a convex cutting edge 17. The arc of curvature of the cutting edge 17 of the blade portion 16 is greater than the arc of curvature of the concave edge 13 of the limb engaging hook 12 and it will be readily understood from an inspection of the drawings that when the arm 15 is swung so as to move its blade portion 16 in the direction of the hook 12, the limb engaged by the hook will be firmly held in the concavity of the hook by the blade portion 16 while the said portion is acting upon the limb to sever it. The arm 15 is offset as at 18 a short distance below its pivotal connection with the member 11 so that the lower portion of its shank extends in the same plane as the shank of the said member 11 and in order to brace the pivotal connection of the arm with the member, a link 19 is secured at one of its ends to the arm by means of a bolt 20 at the offset 18 therein, there being a spacing sleeve 21 interposed between the said end of the link and the arm. The other end of the link has engaged through it the pivot pin 14 which serves to connect the arm and the member 11 and the link, as will be readily understood, and occupies the same position to one side of the member 11 as the upper portion of the arm 15 does to the other side of the said member. A shank 22 is fixed at one of its ends in one end of the other handle member 10 of the implement and the outer end of this shank is turned in the direction of the shank of the member 11 and is bifurcated as at 23 to receive the said shank of the said member, there being a pivot pin 24 passed through the ends of the furcations formed by the bifurcation 23 and also through the shank of the member 11. The shank 22 is formed with an ear 25 and pivoted to this ear is the lower end of a link 26 the upper end of the link being pivoted to the lower end of the arm 15.

From the foregoing description of my invention, it will be seen that I have provided a pruning implement in which the cutting elements coöperate in such a manner as to firmly hold the limb being cut between them and yet obtain a shearing action between the two members. It will further be seen that I have provided means for bracing the pivotal connection of the two members so that considerable strain may be placed upon them without danger of the pivot becoming bent or sheared in two.

What is claimed, is:—

A pruning implement comprising a hook member, an arm pivoted to one side of the hook member and formed with a blade portion coöperating with the concave edge of the hook, the arm being offset to the other side of its pivot from the blade portion, a link pivoted at one end to the hook member by the pivot which connects the arm and the hook member, the link being fixed at its other end to the arm at the offset therein, and means whereby the arm may be swung upon its pivot.

In testimony whereof, I affix my signature, in presence of two witnesses.

BENJAMIN F. TALLEY.

Witnesses:
 MARY WALTON,
 H. A. BULL.